United States Patent [19]
Wenger

[11] 4,065,982
[45] Jan. 3, 1978

[54] TRANSMISSION GEAR SHIFT CONTROL

[76] Inventor: Gerald W. Wenger, 1420 Church Ave., Wisconsin Rapids, Wis. 54494

[21] Appl. No.: 673,907

[22] Filed: Apr. 5, 1976

[51] Int. Cl.² .................. B60K 20/00; F16K 11/02
[52] U.S. Cl. ........................ 74/473 R; 137/625.11; 137/625.46
[58] Field of Search .............. 180/77 R, 77 H; 74/473 R, 504; 137/625.46, 625.11, 625.12

[56]  References Cited
U.S. PATENT DOCUMENTS

| | | | |
|---|---|---|---|
| 2,990,853 | 7/1961 | Sharp | 137/625.46 X |
| 3,373,831 | 3/1968 | Terry et al. | 180/24.09 |
| 3,687,163 | 8/1972 | Nickels | 137/625.11 |
| 3,837,360 | 9/1974 | Bubula | 137/625.11 X |
| 3,941,009 | 3/1976 | Brown | 74/473 R |

Primary Examiner—William R. Cline
Attorney, Agent, or Firm—Edmond T. Patnaude

[57]  ABSTRACT

A gear shift control assembly comprises a single, upright handgrip for moving the shift lever between gear selection positions and for controlling the supply of air to the pneumatic inlets of the transmission system.

5 Claims, 7 Drawing Figures

TRANSMISSION GEAR SHIFT CONTROL

The present invention relates in general to transmission shift lever controls, and it relates more particularly to a new and improved selector for operating a transmission shift lever and for operating a pneumatic control valve for changing the gear ratio for each position of the shift lever.

BACKGROUND OF THE INVENTION

In the past, thirteen speed transmissions and assemblies in trucks and the like have been controlled by means of a transmission shift lever in combination with a threeway air valve for supplying pneumatic pressure through a selected one of two fluid lines to the transmission. The air valve may be mounted on the shift lever as disclosed, for example, in U.S. Pat. No. 3,373,831 or it may be mounted at some other location. When accelerating, the driver moves the shift lever from each gear selection position to the next while simultaneously operating the air valve with his thumb or in some other manner. In this manner a 13 speed transmission can be controlled by moving the shift lever between only five gear selection positions. I have found those operations of the shift lever and the air valve control lever to be an unnatural movement of the hand which is thus very tiring in the course of a day. It would, therefore, be desirable to provide an improved method and apparatus for shifting the combination mechanically and pneumatically operated transmissions of the type commonly used in tractor trailers and known in the trade as Eaton and Spicer transmissions.

SUMMARY OF THE INVENTION

Briefly, there is provided in accordance with the present invention a shift control assembly which is adapted to be mounted on a transmission shift lever. The assembly incorporates a single, upright handgrip which is used to mechanically move the lever between the gear selection positions to selectively connect an inlet pneumatic line to a pair of outlet pneumatic lines connected to the transmission systems. When using this shift control assembly, the operator moves the shift lever through each of the gear shift positions while the handgrip is in the first rotational position. He then shifts back to the first gear shift position while rotating the handgrip up to the low position. He then rotates the handgrip into the high position. To shift into the next gear he moves the lever from the first gear shift position to the second gear shift position while rotating the handgrip back to the low position while the shift lever is between the first and second positions. Shifting up to each succeeding gear is carried out in the same manner. The manual effort required to shift from gear to gear is very noticeably less than required with the prior art controls. This is apparently due to the fact that the entire hand and arm muscles are used both to move the shift lever from position to position as well as to move the air control valve from position to position.

BRIEF DESCRIPTION OF THE DRAWING

Further objects and advantages and a better understanding of the present invention can be had by reference to the following detailed description, wherein.

DETAILED DESCRIPTION OF THE INVENTION

Figure 1:
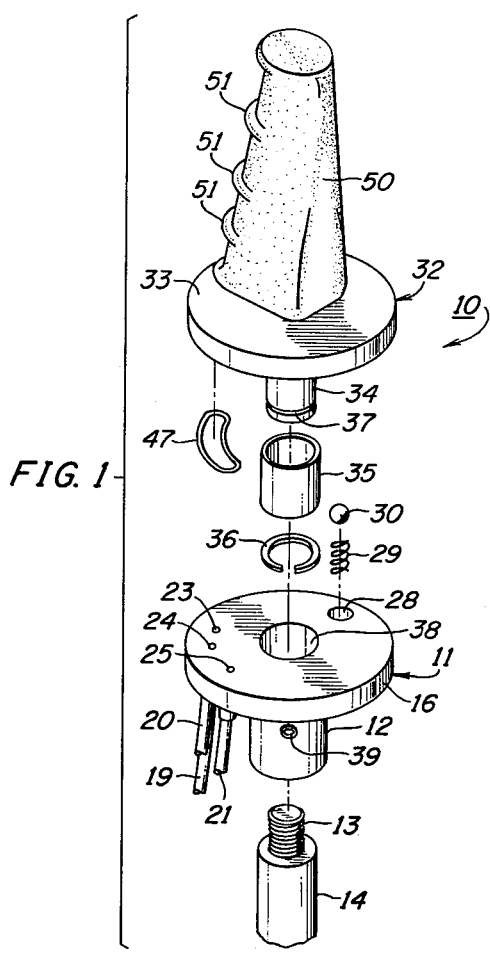
FIG. 1 is an exploded perspective view of the shift lever control assembly of the present invention.
Figure 2:
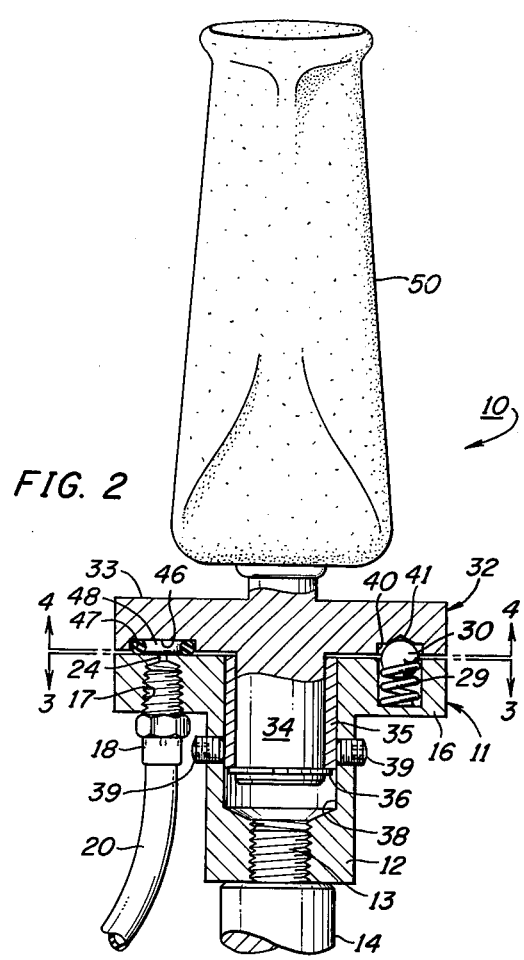
FIG. 2 is an elevational view partly in cross-section of the said control assembly.
Figure 3:
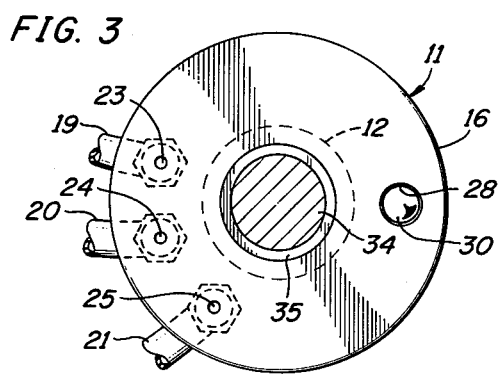
FIG. 3 is a sectional view taken along the line 3—3 of FIG. 2.

Referring now to FIGS. 1 and 2 of the drawing, the control assembly 10 of the present invention comprises a body member 11 having an internally threaded boss part 12 which is adapted to receive the threaded stud 13 which extends upwardly from a conventional transmission shift lever 14. The member 11 has a circular disc-like upper portion 16 provided with three internally threaded holes 17 for receiving the respective fittings of a plurality of airlines 19, 20 and 21. The hole 17 opens onto the top of the disc at angularly spaced apart positions as shown best in FIGS. 1 and 3 at 23, 24 and 25.

The disc portion 16 is provided with a blind hole 28 which receives a coil spring 29 which is compressed in the bottom of the hole 29 and a steel ball 30 having a diameter slightly less than that of the hole 28. As more fully described hereinafter the ball 30 provides a detent for holding the control in each of the different valve control positions.

The control assembly 10 further includes an upper body member 32 having circular disc-like upper portion 33 and a depending shaft 34. A tubular cylindrical bushing 35 is disposed over the shaft portion 34 and is held in place by means of a snap ring 36 which is fitted into a groove 37 near the lower end of the shaft 34 below the bushing 35. With the bushing 35 thus mounted on the shaft 34 the bushing in the shaft is positioned in an axial hole 38 in the lower body member 11 and held in place by a plurality of set screws 39.

Figure 4:
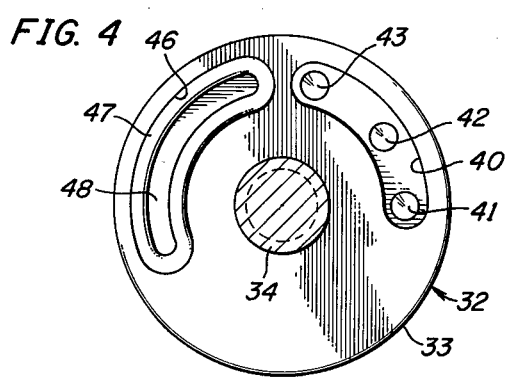
FIG. 4 is a sectional view taken along the line 404 of FIG. 2.

The lower face of the body member 32, as best shown in FIG. 4 is provided with an arcuate groove 40 having three shallow spherically shaped recesses 41, 42 and 43 into which the ball 30 is spring biased for each of the three valve control positions of the body member 32 relative to the body member 11. The upper body member 32 is provided with a second arcuate slot 46 in which is disposed a resilient O-ring 47. The width and the depth dimensions of the slot 46 are such that the O-ring 47 extends a short distance above below the lower surface of the disc member 33 while providing an arcuate open space 48 within the O-ring.

In order to move the shift control lever 14 from gear selector position to gear selector position and also to rotate the upper body member 32 relative to the lower body member 11 thereby to control the supply of air to the pneumatically operated transmission, a handgrip member 50 is mounted in an upright position to the upper body member 32. The handgrip member 50 is preferably provided with an internally threaded opening at the bottom which is threaded onto an upstanding threaded post on the top of the member 32. It is important, however, the handgrip 50 be secured in such manner that it is not movable relative to the control body member 32 during normal operation. The handgrip 50 is so positioned that the forearm of the driver is in a substantially perpendicular position relative to the longitudinal axis of the shift lever 14. Also, the handgrip 50 is provided with raised portions 51 which are adapted to be located between the fingers of the user in substantial alignment with the forearm.

Figure 5A:
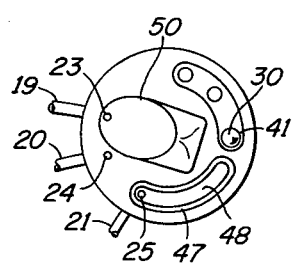
FIGS. 5A, 5B and 5C are views showing the three positions of the pneumatic value of the present invention.

The air line 21 which is connected to the opening 25 in the lower body member 11 is connected to a source of pressurized air, and the lines 19 and 20 are connected to the high and low ports of the transmission. As best illustrated in FIG. 5A with the grip 50 in the illustrated position which is in the start position during a normal start up of the vehicle, the detent ball 30 is in the opening 41 and the inlet air port 25 is disconnected from the ports 23 and 24 so that neither of the lines 19 and 20 is pressurized.

Figure 5B:
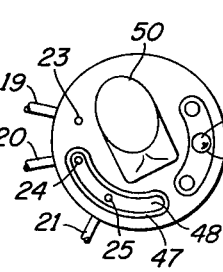

FIG. 5B illustrates the position of the handgrip 50 in the low position wherein the detent ball 30 is in the middle detent recess 42 and the inlet port 25 is connected to the outlet port 24 only whereby pressurized air is supplied to the transmission through the pneumatic line 20.

Figure 5C:
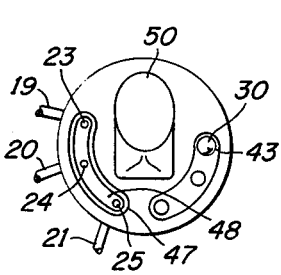

In FIG. 5C the handgrip 50 is in the high position wherein the port 25 is connected to both of the ports 23 and 24 whereby pressurized air is supplied from the inlet line 21 to both of the transmission control airline 19 and 20.

The present invention thus provides a shift control assembly wherein the movement of the shift lever from the gear selector position to gear selector position and the operation of a pneumatic control valve to control the supply of air to the transmission is controlled by the large motor muscles of the body, namely the hand and forearm muscles rather by the finger muscles as was required in the prior art arrangements. The present invention further provides a new and improved valve control mechanism which is particularly useful in the mechanicallypneumatically controlled transmissions for tractor trailer automotive vehicles.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

I claim:

1. A transmission shift control assembly, comprising
a gear shift lever including an upstanding elongated rod,
a first body member mounted to the upper end of said rod,
a second body member rotatably mounted to said first body member for rotation about an axis aligned with the axis of said rod,
means for connecting a plurality of transmission control fluid lines to said first body member,
valve means disposed in said body members and responsive to the relative angular positions of said body members for interconnecting selective ones of said fluid lines,
an elongated hand grip member fixedly secured to said second body member and extending upwardly therefrom with the axis of said hand grip member being aligned with the axis of rotation of said second body member,
whereby said hand grip member may be grasped by the user with the fingers encircling said axis and with the inside of the wrist facing in a horizontal direction to facilitate the simultaneous rotation of said second body member and movement of said rod.

2. The assembly according to claim 1 wherein said second body member comprises
a body having a disc-like portion and a depending shaft portion,
said first body member includes an upwardly opening bore rotatably receiving said shaft portion,
a detent ball and spring mounted in a hole in one of said members,
a plurality of recesses in the opposite face of the other said members, and
said ball being received in a respective one of said recesses for each valving position of said second member.

3. The assembly according to claim 2 wherein
said hole is cylindrical and the principal axis thereof is parallel to the axis of rotation of said second member.

4. The assembly according to claim 1 wherein
said second body member includes a disc-like body portion and a depending shaft portion,
a tubular bushing disposed over said shaft portion,
a snap ring holding said bushing on said shaft portion,
said bushing being disposed in an upwardly opening bore in said first body member, and
means securing said bushing in said bore of said first body member.

5. The assembly according to claim 4 wherein
said first body member is provided with an internally threaded boss for receiving the upper end of a gear shift lever, and
said second body member is provided with an upstanding externally threaded stud,
said hand grip having an internally threaded hole in the lower end receiving said stud.

* * * * *